G. A. LYON.
ADJUSTABLE ATTACHMENT BUFFER.
APPLICATION FILED FEB. 10, 1920.
1,357,507.
Patented Nov. 2, 1920.
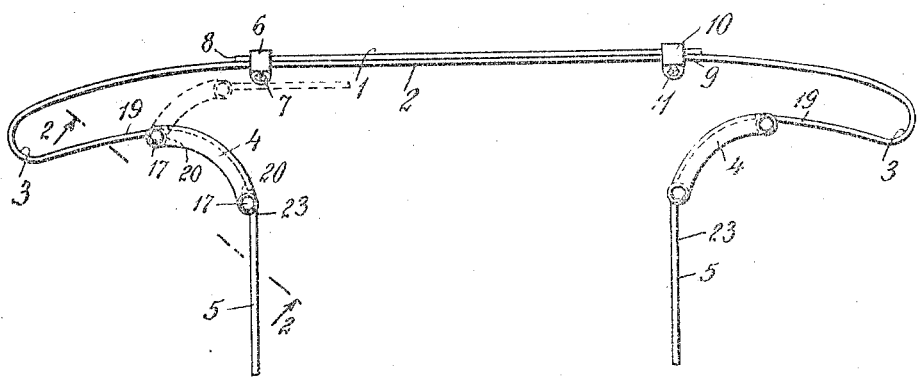
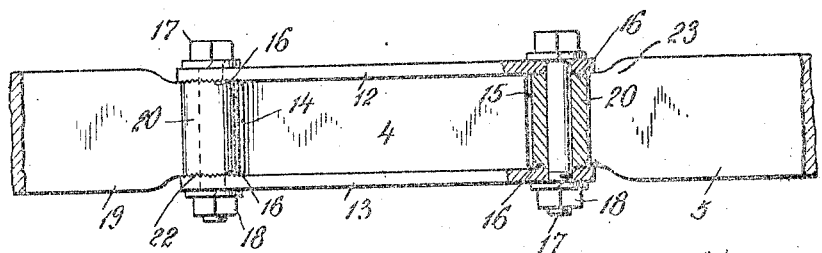
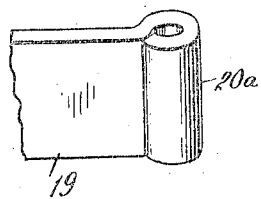 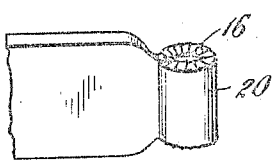 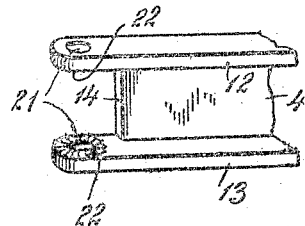
Inventor
George Albert Lyon
By his Attorney

UNITED STATES PATENT OFFICE.

GEORGE ALBERT LYON, OF PHILADELPHIA, PENNSYLVANIA.

ADJUSTABLE-ATTACHMENT BUFFER.

1,357,507.  Specification of Letters Patent.  Patented Nov. 2, 1920.

Application filed February 10, 1920. Serial No. 357,756.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Adjustable-Attachment Buffers, of which the following is a specification taken in connection with the accompanying drawing.

This invention relates especially to buffers for automobiles or other vehicles in which the buffer front of any suitable shape and construction and preferably having looped ends is pivotally or loosely connected with the attaching members as through suitable pivoted connector links which provide hinge adjustment between these parts, so that the attaching members may be adjusted with respect to the buffer front so as to fit vehicle frame members at different distances apart. The pivotal or hinge joints used in connection with these links may be provided with serrated or other roughened ends or contact surfaces, and connector bolts may be used to strongly tighten these coöperating connector members so as to strongly and rigidly hold the parts in adjusted position and prevent shake and rattle under running conditions of the vehicle. In this way one or more pivotal or hinge joints may be provided in one or both sides of the buffer attaching connection, and the attaching members may, in some cases, be folded inward toward or against the buffer front to make a more compact shipping condition of the buffer.

In the accompanying drawing showing in a somewhat diagrammatic way an illustrative embodiment of this invention, Figure 1 is a plan view of an illustrative buffer.

Fig. 2 is an enlarged side view taken substantially along the line 2—2 of Fig. 1, parts being shown in section; and Figs. 3, 4 and 5 are enlarged perspective views showing different parts of the construction.

The buffer front may be of any desired shape and construction, and with such adjustable attaching members and connections a one piece buffer front may be used, if desired. As indicated the buffer front may be formed of resilient strip material such as spring steel strip of suitable size and composition, the front strip 2 preferably having end loops 3 on which the connector portions 19 may be formed. The buffer front, may in some cases, be reinforced by suitable reinforcing strips or members such as one or more additional spring strips 1, secured to the front member in any suitable way, and having the ends 8, 9 projecting out toward the end loops of the buffer front. In some cases it is desirable to detachably connect such reinforcing strips or members to the buffer front, for which purpose suitable clamping devices 6, 10 may be provided to more or less inclose the coöperating strips around which they are tightened by the bolts or nuts 7, 11.

The attaching members 5 may be formed of generally similar spring steel strip, if desired, and may have the usual bolt holes or slots through which apertures may extend hook bolt or other attaching devices to clamp or secure the attaching members to the frame members of the automobile or other vehicle. These attaching members may have connector portions 23, adjustably connected to the buffer front by pivoted connector links such as 4, which if desired may have at each end an adjustable hinge or pivotal connection with these coöperating buffer members so that the position of the attaching members may be adjusted to fit the vehicle frame members and then the parts clamped so as to give a considerable degree of rigidity and strength to these hinge or pivotal connecting portions. The connector links 4 may as indicated in greater detail in Figs. 2 and 5, be of flanged construction so as to comprise the web 4 and projecting flanges 12, 13, which may more or less inclose the pivotal or connector portions of the coöperating buffer members to which they may be clamped by any suitable means such as the clamping connector bolts 17 and nuts 18 with which lock washers may coöperate as indicated. In many cases it is desirable to have these connector flanges 22 inclose the coöperating pivotal portions which may advantageously be in the form of integral connector sockets such as 20 formed on the coöperating buffer members and provided with serrated ends 16, which may be recessed or retracted within the edges of the adjacent strip or connector portions of the buffer members on which they are formed so as to give a generally uniform width to these connected buffer members. If desired, such connector sockets may be formed by first bending around a strip end 20ª on one of the strips 19 as indicated in Fig. 3 and then by suitable drop forging or shaping methods this socket portion may be compressed, forged and shaped accurately and simultaneously given the serrated ends 16, as is shown in Fig. 4, in a somewhat diagrammatic way. The connector links may also be forged or shaped so as to form the edges 14, 15 of the web portion 4 and to form serrations or corrugations on the connector flanges 22 which may have such shape and size as to coöperate with the serrated ends of the connector sockets with which they coöperate. Then when the holes 21 are formed in these connector flanges they may be slipped over the coöperating sockets and connected thereto by the connector bolts which allow the parts to be forcibly moved or adjusted when the bolts are not tightened. This makes it possible to swing these connector links and attaching members inward toward the buffer front when the buffer is packed or shipped in connection with its sale and the buffer is thus all in one piece, requiring only the opening out and adjustment of these parts and tightening of the connector bolts to make it fit any regular automobile to which it may be quickly and easily attached by the use of hook bolts or other devices. These connector bolts force the serrated or corrugated faces of these hinge or pivotal connector members together so strongly as to prevent undesirable movement of the parts under running conditions and to give a high degree of strength and rigidity and resistance to movement even under collision conditions.

This invention has been described in connection with a number of illustrative forms, proportions, parts, arrangements, materials, methods of connection and use, to the details of which disclosure the invention is not of course to be limited, since what is claimed as new and what is desired to be secured by Letters Patent is set forth in the appended claims.

1. The automobile buffer comprising a spring strip buffer front member having a one piece resilient strip front formed with end loops and connector portions, a front reinforcing strip connected to said buffer front, resilient strip attaching members having connector portions, flanged connector links having on each end inclosing connector flanges formed with opposing inner faces, integral connector sockets formed on said connector portions and having ends recessed within the edges of the adjacent strip to be engaged and clamped between the opposing faces of said connector flanges, and connector bolts passing through said flanges and sockets to adjustably clamp the coöperating parts together.

2. The automobile buffer comprising a spring strip buffer front member having a one piece resilient strip front formed with end loops and connector portions, resilient strip attaching members having connector portions, connector links having on each end inclosing connector flanges formed with opposing inner faces, integral connector sockets formed on said connector portions and having ends recessed within the edges of the adjacent strip to be engaged and clamped between the opposing faces of said connector flanges, and connector bolts passing through said flanges and sockets to adjustably clamp the coöperating parts together.

3. The automobile buffer comprising a buffer front member having a resilient strip front formed with end loops and connector portions, attaching members having connector portions, connector links having on each end inclosing connector flanges formed with opposing inner faces, connector sockets formed on said connector portions and having ends recessed within the edges of the adjacent strip to be engaged and clamped between the opposing faces of said connector flanges, and connector bolts passing through said flanges and sockets to adjustably clamp the coöperating parts together.

4. The automobile buffer comprising a one piece spring strip buffer front member having end loops and inturned connector portions, resilient strip attaching members having connector portions and flanged connector links having on each end inclosig connector flanges formed with corrugated opposing inner faces, integral connector sockets formed on said connector portions and having serrated ends recessed within the edges of the adjacent connector portion strip to be engaged and clamped between the opposing faces of said connector flanges, and connector bolts passing through said flanges and sockets to adjustably clamp the coöperating parts together.

5. The automobile buffer comprising a buffer front member having connector portions, attaching members having connector portions and flanged connector links having on each end inclosing connector flanges formed with corrugated opposing inner faces, integral connector sockets formed on said connector portions and having serrated ends recessed within the edges of the adjacent connector portion to be engaged and clamped between the opposing faces of said connector flanges, and connector bolts passing through said flanges and sockets to adjustably clamp the coöperating parts together.

6. The automobile buffer comprising a buffer front member having connector portions, attaching members having connector portions and flanged connector links having inclosing connector flanges formed with opposing inner faces, integral connector sockets formed on said connector portion and having to be engaged and clamped between the opposing faces of said connector flanges, and connector bolts passing through said flanges and sockets to adjustably clamp the coöperating parts together.

7. The automobile buffer comprising buffer front member having end loops and inturned pivotal connector portions, resilient strip attaching members having pivotal connector portions and connector links having on each end flanged connector portions adapted to coöperate with said pivotal connector portions, and connector bolts passing through said connector portions to adjustably clamp the coöperating parts together.

8. The automobile buffer comprising a buffer front member having pivotal connector portions, attaching members having pivotal connector portions and connector links having on each end connector portions adapted to coöperate with said pivotal connector portions, and connector bolts passing through said connector portions to adjustably clamp the coöperating parts together.

9. The automobile buffer comprising a buffer front member having pivotal connector portions, attaching members having pivotal connector portions and connector links having connector portions adapted to coöperate with said pivotal connector portions, and connector bolts to adjustably clamp the coöperating parts together.

10. The automobile buffer comprising a buffer front member having an inturned pivotal connector portion, attaching members comprising a pivotal connector portion and a connector link having on each end flanged connector portions adapted to coöperate with said pivotal connector portion, and means to adjustably clamp the coöperating parts together.

11. The automobile buffer comprising a buffer front member having a pivotal connector portion, attaching members comprising a pivotal connector portion and a connector link having a connector portion adapted to coöperate with said pivotal connector portion, and means to adjustably clamp the coöperating parts together.

GEORGE ALBERT LYON.